United States Patent
Kato

(10) Patent No.: US 10,104,352 B2
(45) Date of Patent: Oct. 16, 2018

(54) PROJECTOR AND IMAGE DISPLAY METHOD

(71) Applicant: NEC Display Solutions, Ltd., Tokyo (JP)

(72) Inventor: Atsushi Kato, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 109 days.

(21) Appl. No.: 15/114,062

(22) PCT Filed: Feb. 17, 2014

(86) PCT No.: PCT/JP2014/053582
§ 371 (c)(1),
(2) Date: Jul. 25, 2016

(87) PCT Pub. No.: WO2015/122001
PCT Pub. Date: Aug. 20, 2015

(65) Prior Publication Data
US 2016/0373708 A1     Dec. 22, 2016

(51) Int. Cl.
*H04N 9/31* (2006.01)
*G03B 21/20* (2006.01)
(Continued)

(52) U.S. Cl.
CPC ............. *H04N 9/3188* (2013.01); *G03B 5/00* (2013.01); *G03B 21/005* (2013.01);
(Continued)

(58) Field of Classification Search
CPC .. H04N 9/3188; H04N 9/3197; H04N 9/3164; H04N 9/3161; H04N 9/315;
(Continued)

(56) References Cited

U.S. PATENT DOCUMENTS

2004/0012761 A1* 1/2004 Haino ................. H04N 9/3105
353/31
2005/0248733 A1* 11/2005 Sakata ................ H04N 9/3117
353/94

FOREIGN PATENT DOCUMENTS

JP     1992-113308 A     4/1992
JP     1995-104278 A     4/1995
(Continued)

OTHER PUBLICATIONS

Japanese Office Action dated Jul. 18, 2017 with an English translation thereof.

(Continued)

*Primary Examiner* — Christina Riddle
*Assistant Examiner* — Christopher Lamb, II
(74) *Attorney, Agent, or Firm* — McGinn I.P. Law Group, PLLC.

(57) ABSTRACT

A projector includes: first and second display panels and a projection unit that superposes images formed by the first and second display panels and that projects the superposed images on a projection surface. The first and second display panels are arranged such that the image formed by one display panel is projected to a position shifted by a predetermined distance in at least one of the row direction and column direction of the picture element array with respect to the position where the image formed by the other display panel is projected.

7 Claims, 12 Drawing Sheets

(51) Int. Cl.
*G06F 3/14* (2006.01)
*G03B 5/00* (2006.01)
*G03B 21/00* (2006.01)
*G09G 3/00* (2006.01)

(52) U.S. Cl.
CPC ......... *G03B 21/204* (2013.01); *G06F 3/1446* (2013.01); *G09G 3/007* (2013.01); *H04N 9/3105* (2013.01); *H04N 9/3117* (2013.01); *H04N 9/3158* (2013.01); *H04N 9/3164* (2013.01); *G09G 2310/0235* (2013.01)

(58) Field of Classification Search
CPC .. H04N 9/3117; H04N 9/3155; G03B 21/204; G02B 26/008
See application file for complete search history.

(56) References Cited

FOREIGN PATENT DOCUMENTS

| | | |
|---|---|---|
| JP | 2000-241916 A | 9/2000 |
| JP | 2002-107821 A | 4/2002 |
| JP | 2003-322908 A | 11/2003 |
| JP | 2005-321524 A | 11/2005 |
| JP | 2006-014607 A | 1/2006 |
| JP | 2006-251357 A | 9/2006 |
| JP | 2010-243545 A | 10/2010 |
| JP | 2010-250003 A | 11/2010 |
| JP | 2013-011652 A | 1/2013 |
| JP | 2013-068950 A | 4/2013 |
| WO | WO 2009/041038 A1 | 4/2009 |
| WO | WO 2012/086011 A1 | 6/2012 |

OTHER PUBLICATIONS

International Search Report (ISR) (PCT Form PCT/ISA/210), in PCT/JP2014/053582, dated Apr. 28, 2014.

* cited by examiner

PROJECTOR AND IMAGE DISPLAY METHOD

TECHNICAL FIELD

The present invention relates to a projector and an image display method.

BACKGROUND ART

Regarding the development of higher image quality of projectors, there is increasing demand for higher resolution, to say nothing of brightness and color reproducibility. In response, technology has been proposed relating to the higher resolution of a projected image.

For example, Patent Document 1 discloses a projection display device that is capable of providing a projected image having twice the number of pixels as the number of pixels of a display panel.

The projection-type display device described in Patent Document 1 has a liquid crystal panel for display, a projection optical system that enlarges and projects the image formed on the liquid crystal panel for display on a screen, and shifting means provided between the liquid crystal panel for display and the projection optical system.

The shifting means is a component that uses the double-refraction phenomenon of a quartz plate to shift the optical path and includes a quartz plate and a liquid crystal panel for controlling the polarization direction. The image light from the liquid crystal panel for display is irradiated into the quartz plate by way of the liquid crystal panel for controlling the polarization direction.

The liquid crystal panel for controlling polarization direction is provided for controlling the polarization direction of light that is irradiated into the quartz plate. The optical path of light that is emitted from the quartz plate when the liquid crystal panel for controlling the polarization direction is OFF is shifted in a predetermined direction with respect to the optical path of light that is emitted from the quartz plate when the liquid crystal panel for controlling the polarization direction is ON.

An original image having a number of pixels that is twice the number of pixels of the liquid crystal panel for display is divided into two images I1 and I2 at a spacing of one pixel in the horizontal direction, and images I1 and I2 are displayed in time divisions on a liquid crystal panel for display. The liquid crystal panel for polarization control is turned ON during the display interval of image I1 and the liquid crystal panel for polarization control is turned OFF during the display interval of image I2.

The projected image of image I1 and the projected image of image I2 are displayed on the screen in time divisions. The projected image of image I2 is displayed at a position that is shifted by one-half the pixel pitch in the horizontal direction with respect to the projected image of image I1. By making the display cycle of images I1 and I2 shorter than the afterimage interval of the human eye, an image in which the projected images of images I1 and I2 are superposed can be observed. This observed image (the superposed image of images I1 and I2) has a number of pixels that is equivalent to the original image.

Configurations in which an optical path shifting means is provided between a liquid crystal panel and projection lens to increase the number of pixels of a projected image are also disclosed in Patent Documents 2 and 3.

LITERATURE OF THE PRIOR ART

Patent Documents

Patent Document 1: Japanese Unexamined Patent Application Publication No. H04-113308
Patent Document 2: Japanese Unexamined Patent Application Publication No. 2006-146074
Patent Document 3: Japanese Unexamined Patent Application Publication No. H07-104278

DISCLOSURE OF THE INVENTION

Nevertheless, the devices disclosed in Patent Documents 1 to 3 entail the problems of increased scale and higher costs of the devices due to the necessity of providing an optical path shifting means.

There is the further problem in which the amount of power consumption increases due to the consumption of electric power by the optical path shifting means.

An object of the present invention is to provide a projector and image display method that can display a high-precision projected image and solve the problems described above.

According to one aspect of the present invention for achieving the above-described object, a projector is provided that includes:

first and second display panels that are each equipped with a plurality of picture elements and that modulate incident light by means of the plurality of picture elements to form images; and projection means that superposes the images that are formed on the first and second display panels to project the superposed images on a projection surface;

wherein the first and second display panels are arranged such that the image of one of the display panels is projected on a position that is shifted by a predetermined distance with respect to the image of the other display panel.

According to another aspect of the present invention, an image display method is provided that is an image display method carried out in a projector that is provided with first and second display panels that are each equipped with a plurality of picture elements and that modulate incident light by means of the plurality of picture elements to form images, and that superposes the images formed by the first and second display panels to project the superposed images on a projection surface, the method including:

arranging the first and second display panels such that the image of one display panel is projected on a position that is shifted by a predetermined distance with respect to the image of the other display panel; and forming a first green image on the first display panel, and alternately forming a second green image, in which at least the luminance differs from that of the first green image, and a blue image or red image on the second display panel.

EXPLANATION OF REFERENCE NUMBERS 11-14 light source unit
101, 102 dichroic mirror
103-105 polarization beam splitter
106-108 display panel
109 cross-dichroic mirror
110 projection lens

MODE FOR CARRYING OUT THE INVENTION

Exemplary embodiments of the present invention are next described with reference to the accompanying drawings.

First Exemplary Embodiment

Figure 1:
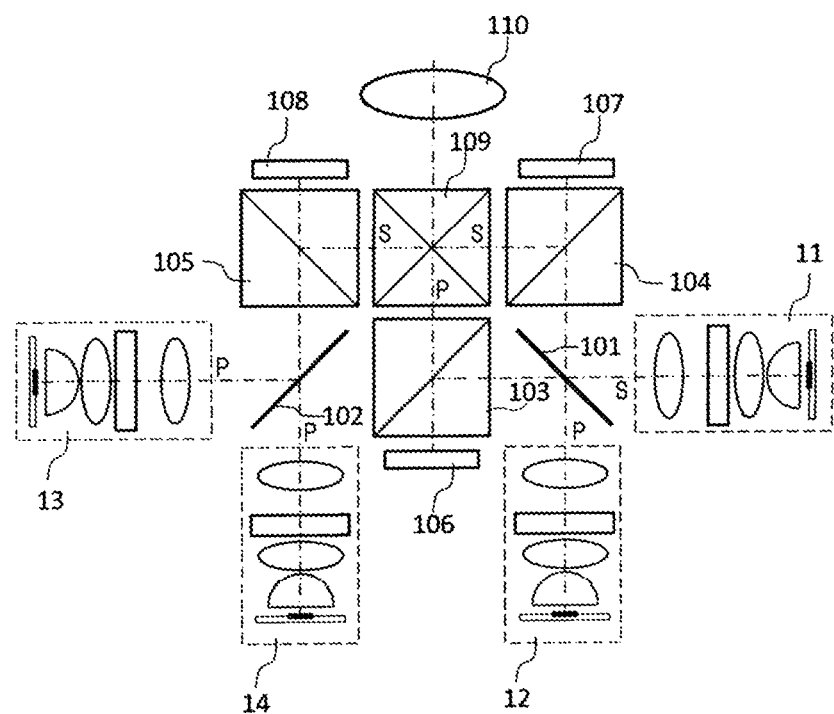
FIG. 1 is a schematic view showing the configuration of a projector according to a first exemplary embodiment of the present invention.

FIG. 1 is a schematic view showing the configuration of the projector according to the first exemplary embodiment of the present invention.

Referring to FIG. 1, the projector is what is known as a three-panel projector that uses three display panels and that includes: light source units 11-14, dichroic mirrors 101 and 102, polarization beam splitters 103-105, display panels 106-108, cross-dichroic mirror 109, and projection lens 110.

Light source units 11 and 14 are each equipped with a green solid-state light source that supplies green light having its peak wavelength in the green wavelength band (for example, an LED or semiconductor laser in which the emitted light color is green) and are configured such that the output light of this green solid-state light source is emitted as parallel light flux.

Light source units 11 and 14 are of the same configuration (the emitted light wavelengths are the same) and the actual configuration is therefore here described taking light source unit 11 as an example.

Figure 2:
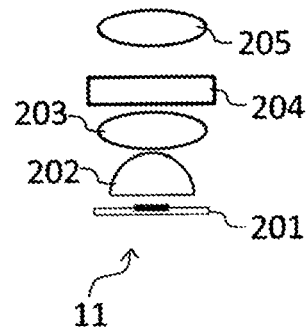
FIG. 2 is a schematic view showing an example of the light source unit of the projector shown in FIG. 1.

FIG. 2 shows an example of light source unit 11. As shown in FIG. 2, light source unit 11 includes LED light source 201, collimator lenses 202 and 203, polarization conversion unit 204, and lens 205.

LED light source 201 emits green light. With the trend to larger sizes of light-emitting elements in recent years, high-current high-light-output LED light sources that can be driven at several tens of amperes are available, and such a light source may be used as LED light source 201.

Collimator lenses 202 and 203 are components for converting the output light of LED light source 201 to parallel light flux. In addition, the shape, size, and number of lenses of the collimator lenses can be altered as appropriate.

The output light of LED light source 201 is irradiated into polarization conversion unit 204 by way of collimator lenses 202 and 203. The output light of LED light source 201 is unpolarized light, and polarization conversion unit 204 adjusts the unpolarized light from LED light source 201 to P-polarized light or S-polarized light that is linearly polarized light. For example, a configuration that combines a polarization beam splitter array and retardation plate can be used as polarization conversion unit 204. The light can be adjusted to any polarization of P-polarization and S-polarization by the selection of the polarization beam splitter and the retardation plate.

Lens 205 makes up at least a portion of the optical system that irradiates the light from polarization conversion unit 204 to display panel 106.

Light source unit 12 is provided with a red solid-state light source that supplies red light having its peak wavelength in the red wavelength band (for example, an LED or semiconductor laser in which the emitted light color is red) and is configured such that the output light of this solid-state light source is emitted as parallel light flux.

Light source unit 13 is provided with a blue solid-state light source that supplies blue light having its peak wavelength in the blue wavelength band (for example, an LED or semiconductor laser in which the color of emitted light is blue) and is configured such that the output light of this blue solid-state light source is emitted as parallel light flux.

With the exception that the emitted light colors of the LED light sources differ, light source units 12 and 13 are made up of a unit configuration such as shown in FIG. 2. A light source high current-high-light output red LED and blue LED can be used as the LED light sources.

In the present exemplary embodiment, green light (S-polarized light) is emitted from light source unit 11, green light (P-polarized light) is emitted from light source unit 14, red light (P-polarized light) is emitted from light source unit 12, and blue light (P-polarized light) is emitted from light source unit 13.

The optical axis of light source unit 11 and the optical axis of light source unit 12 are orthogonal, and dichroic mirror 101 is arranged at the intersection of these optical axes. Dichroic mirror 101 has the property of transmitting green light and red light. This dichroic mirror 101 may be omitted.

The green light (S-polarized light) from light source unit 11 is transmitted by dichroic mirror 101 and irradiated into polarization beam splitter 103.

Polarization beam splitter 103 has the property of transmitting P-polarized light and reflecting S-polarized light. The green light (S-polarized light) from light source unit 11 is thus reflected in the direction of display panel 106 by polarization beam splitter 103. The green light (S-polarized light) that is reflected by polarization beam splitter 103 is irradiated into display panel 106.

The red light (P-polarized light) from light source unit 12 is transmitted through dichroic mirror 101 and irradiated into polarization beam splitter 104.

Polarization beam splitter 104 has the property of transmitting P-polarized light and reflecting S-polarized light. The red light (P-polarized light) from light source unit 12 is thus transmitted through polarization beam splitter 104 and irradiated into display panel 107.

The optical axis of light source unit 13 and the optical axis of light source unit 14 are orthogonal, and dichroic mirror 102 is arranged at the intersection of these optical axes. Dichroic mirror 102 has the property of reflecting blue light and transmitting green light.

The blue light (P-polarized light) from light source unit 13 is reflected in the direction of polarization beam splitter 105 by dichroic mirror 102. On the other hand, the green light (P-polarized light) from light source unit 14 is transmitted through dichroic mirror 102 and irradiated into polarization beam splitter 105.

Polarization beam splitter 105 has the property of transmitting P-polarized light and reflecting S-polarized light. The blue light (P-polarized light) from light source unit 13 and the green light (P-polarized light) from light source unit 14 are each transmitted through polarization beam splitter 105 and irradiated into display panel 108.

Display panels 106-108 are reflective liquid crystal panels of which Liquid Crystal on Silicon (LCoS) is representative.

Display panel 106 spatially modulates the green light (S-polarized light) from light source unit 11 to form a green image. This green image is formed from reflected light (P-polarized light) from display panel 106. The reflected light (P-polarized light) from display panel 106 is transmitted through polarization beam splitter and irradiated into cross-dichroic prism 109.

Display panel 107 spatially modulates the red light (P-polarized light) from light source unit 12 to form a red image. This red image is made up of the reflected light (S-polarized light) from display panel 107.

The reflected light (S-polarized light) from display panel 107 is reflected in the direction of cross-dichroic prism 109 by polarization beam splitter 104.

Display panel 108 spatially modulates the blue light (P-polarized light) from light source unit 13 to form a blue image and spatially modulates the green light (P-polarized light) from light source unit 14 to form a green image. The blue image and green image are formed in time divisions, and both images are made up of the reflected light (S-polarized light) from display panel 108.

The reflected light (S-polarized light) from display panel 108 is reflected in the direction of cross-dichroic prism 109 by polarization beam splitter 105.

Cross-dichroic prism 109 combines the image light from display panels 106-108.

Figure 3:
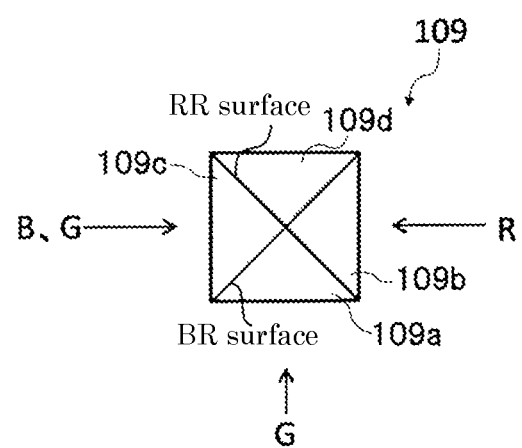
FIG. 3 is a schematic view showing an example of the cross-dichroic prism of the projector shown in FIG. 1.

FIG. 3 is a schematic view showing an example of cross-dichroic prism 109.

As shown in FIG. 3, cross-dichroic prism 109 includes four right-angle prisms 109a-109d. Each of right-angle prisms 109a-109d includes: the first and second surfaces that constitute the sides that form the right angle of the triangle of the base; and a third surface that constitutes the hypotenuse of the triangle.

The first surface of right-angle prism 109a is joined to the second surface of right-angle prism 109b, and the second surface of right-angle prism 109a is joined to the first surface of right-angle prism 109c. The first surface of right-angle prism 109d is joined to the second surface of right-angle prism 109c, and the second surface of right-angle prism 109d is joined to the first surface of right-angle prism 109b.

A uniform surface is formed by the joined surfaces of the first surface of right-angle prism 109a and the second surface of right-angle prism 109b and the joined surfaces of the first surface of right-angle prism 109d and the second surface of right-angle prism 109c, and the RR surface is formed on this surface.

A uniform surface is formed by the joined surfaces of the second surface of right-angle prism 109a and the first surface of right-angle prism 109b and the joined surfaces of the first surface of right-angle prism 109c and the second surface of right-angle prism 109d, and the BR surface is formed on this surface.

Figure 4A:
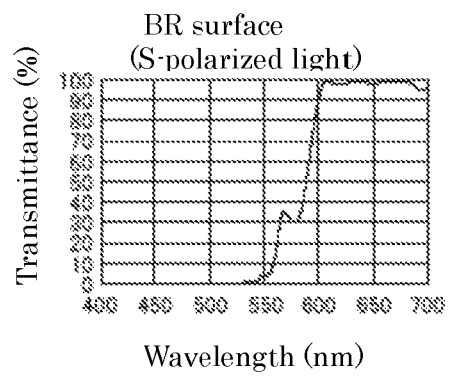
FIG. 4A is a characteristics chart showing the spectral transmission characteristics for S-polarized light of the BR surface of the cross-dichroic prism shown in FIG. 3.
Figure 4B:
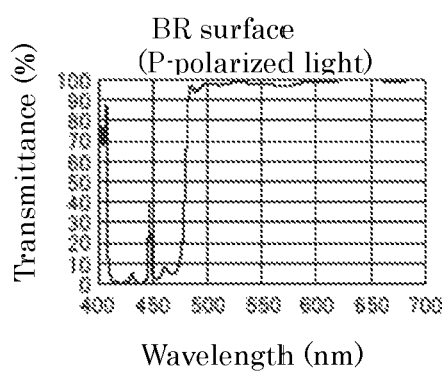
FIG. 4B is a characteristics chart showing the spectral transmission characteristics for P-polarized light of the BR surface of the cross-dichroic prism shown in FIG. 3.

FIG. 4A shows the spectral transmission characteristics of the BR surface for S-polarized light. FIG. 4B shows the spectral transmission characteristics of the BR surface for P-polarized light. In FIGS. 4A and 4B, the horizontal axis shows the wavelength (nm) and the vertical axis shows the transmittance (%).

As shown in FIG. 4A, for S-polarized light, the BR surface has the property of reflecting light of the blue and green wavelength bands and transmitting light of the red wavelength band. Further, as shown in FIG. 4B, for P-polarized light, the BR surface has the property of reflecting light of the blue wavelength band and transmitting light of other wavelength bands (including the green and red wavelength bands). By means of these properties of FIGS. 4A and 4B, green light (P-polarized light) and red light (S-polarized light) are transmitted through the BR surface and blue light (S-polarized light) and green light (S-polarized light) are reflected by the BR surface.

Figure 4C:
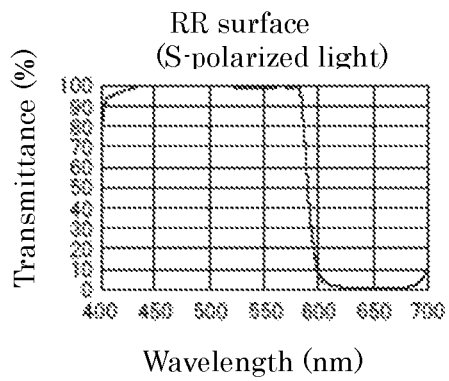
FIG. 4C is a characteristics chart showing the spectral transmission characteristics for S-polarized light of the RR surface of the cross-dichroic prism shown in FIG. 3.
Figure 4D:
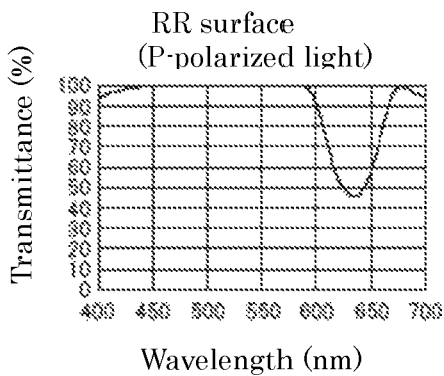
FIG. 4D is a characteristics chart showing the spectral transmission characteristics for P-polarized light of the RR surface of the cross-dichroic prism shown in FIG. 3.

FIG. 4C shows the spectral transmission characteristics for S-polarized light of the RR surface. FIG. 4D shows the spectral transmission characteristics of the RR surface for P-polarized light. In FIGS. 4C and 4D, the horizontal axis shows wavelength (nm) and the vertical axis shows the transmittance factor (%).

As shown in FIG. 4C, for S-polarized light, the RR surface has the property of transmitting light of the blue and green wavelength bands and reflecting light of the red wavelength band. In addition, as shown in FIG. 4D, for P-polarized light, the RR surface has the property of reflecting light of the red wavelength band and transmitting light of other wavelength bands (including the green and blue wavelength bands). In accordance with these characteristics of FIGS. 4C and 4D, green light (P-polarized light and S-polarized light) and blue light (S-polarized light) are transmitted through the RR surface and red light (S-polarized light) is reflected by the RR surface.

In cross-dichroic prism 109 shown in FIG. 3, the third surface of each of right-angle prisms 109a-109c is assumed to be the first, second, and third incident surfaces, respectively, and the third surface of right-angle prism 109d is assumed to be the emission surface.

Green light (P-polarized light) from display panel 106 is irradiated from the first incident surface, red light (S-polarized light) from display panel 107 is irradiated from the second incident surface, and blue light (S-polarized light)

and green light (S-polarized light) from display panel 108 are irradiated from the third incident surface.

The green light (P-polarized light) that was irradiated from the first incident surface is transmitted through the BR surface and the RR surface and is emitted from the emission surface. The red light (S-polarized light) that was irradiated from the second incident surface is reflected by the RR surface and then emitted from the emission surface. The blue light (S-polarized light) and green light (S-polarized light) that were irradiated from the third incident surface are reflected by the BR surface and then emitted from the emission surface.

Projection lens 110 is arranged on the emission surface side of cross-dichroic prism 109. Projection lens 110 enlarges and projects the images that are formed by display panels 106-108 on the projection surface.

Each of display panels 106-108 is provided with an image formation region in which is formed an image composed of a plurality of picture elements. The number of picture elements and picture element size of display panels 106-108 are the same. However, the relative positional relation of the image formation regions on the projection surface differs for display panel 108 and display panels 106 and 107.

For example, on the projection surface, the image formation region of display panel 108 is projected on a position that is shifted by a predetermined amount in the horizontal direction (the direction of the picture element rows), the vertical direction (the direction of the picture element columns), or in both directions with respect to the projection position of the image formation region of display panel 106. Display panel 107 is arranged such that the projection position of its image formation region coincides with the projection position of the image formation region of display panel 106. The perpendicular line that passes through the center of the image formation region of display panel 108 and the perpendicular line that passes through the center of the image formation region of display panel 106 do not lie on the same plane. On the other hand, the perpendicular line that passes through the center of the image formation region of display panel 106 and the perpendicular line that passes through the center of the image formation region of display panel 107 lie on the same plane. In these cases, the center of an image formation region is also the intersection of the diagonal lines of the image formation region. Together with this, the center ray (optical axis) of each of luminous flux from light source unit 11 and light source unit 12 and the center ray (optical axis) of each of luminous flux from light source unit 13 and light source unit 14 do not lie in the same plane.

Figure 5:
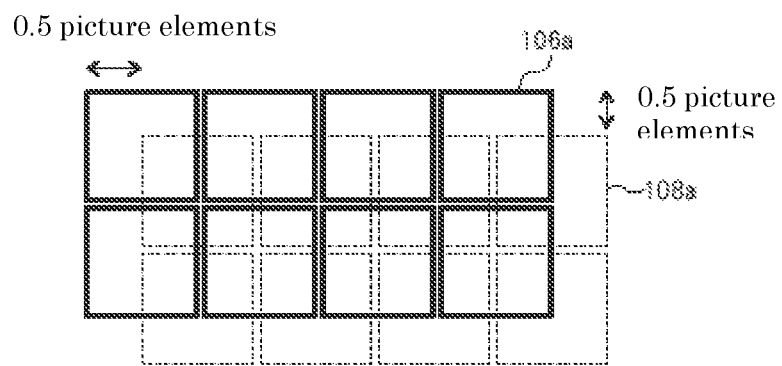
FIG. 5 is a schematic view for describing the relative positional relation on the projection surface of the image formation regions of the two display panels of the projector shown in FIG. 1.

FIG. 5 gives a schematic representation of the relative positional relation of the image formation regions of display panels 106 and 108 on the projection surface.

As shown in FIG. 5, picture element 108a of the projected image of display panel 108 is shifted by 0.5 picture elements (indicating 0.5 times the picture element pitch) in each of the row direction and column direction with respect to picture element 106a of the projected image of display panel 106 that corresponds to picture element 108a.

In the present exemplary embodiment, a panel arrangement that shifts the corresponding picture element of an image that is projected on the projection surface between display panel 108 and display panel 106 is used to increase the number of picture elements of the observed image when the projected image is viewed.

More specifically, a green image is formed on display panel 106, a red image is formed on display panel 107, and a blue image and a green image are formed in time divisions on display panel 108. On the projection surface, the green image that is formed on display panel 108 is projected to a position that is shifted by 0.5 picture elements in each of the row direction and column direction with respect to the projected position of the green image that is formed on display panel 106. Due to the afterimage phenomenon of the human eye, an image is observed in which these green images are spatially or temporally blended (a superposed image). The number of picture elements of this observed image is approximately four times the number of picture elements of each of display panels 106 and 108.

Human vision typically has a high spatial frequency characteristic for luminance but has a relatively low characteristic for hue or saturation, and the contribution of green to the luminance component is greater than that of red and blue. Accordingly, higher resolution of the observed image (superposed image) of the images (red, blue and green) formed by display panels 106-108 can be achieved by increasing the number of picture elements only for the green image.

The configuration and operation of the control system of the projector of the present exemplary embodiment are next described in detail.

Figure 6:
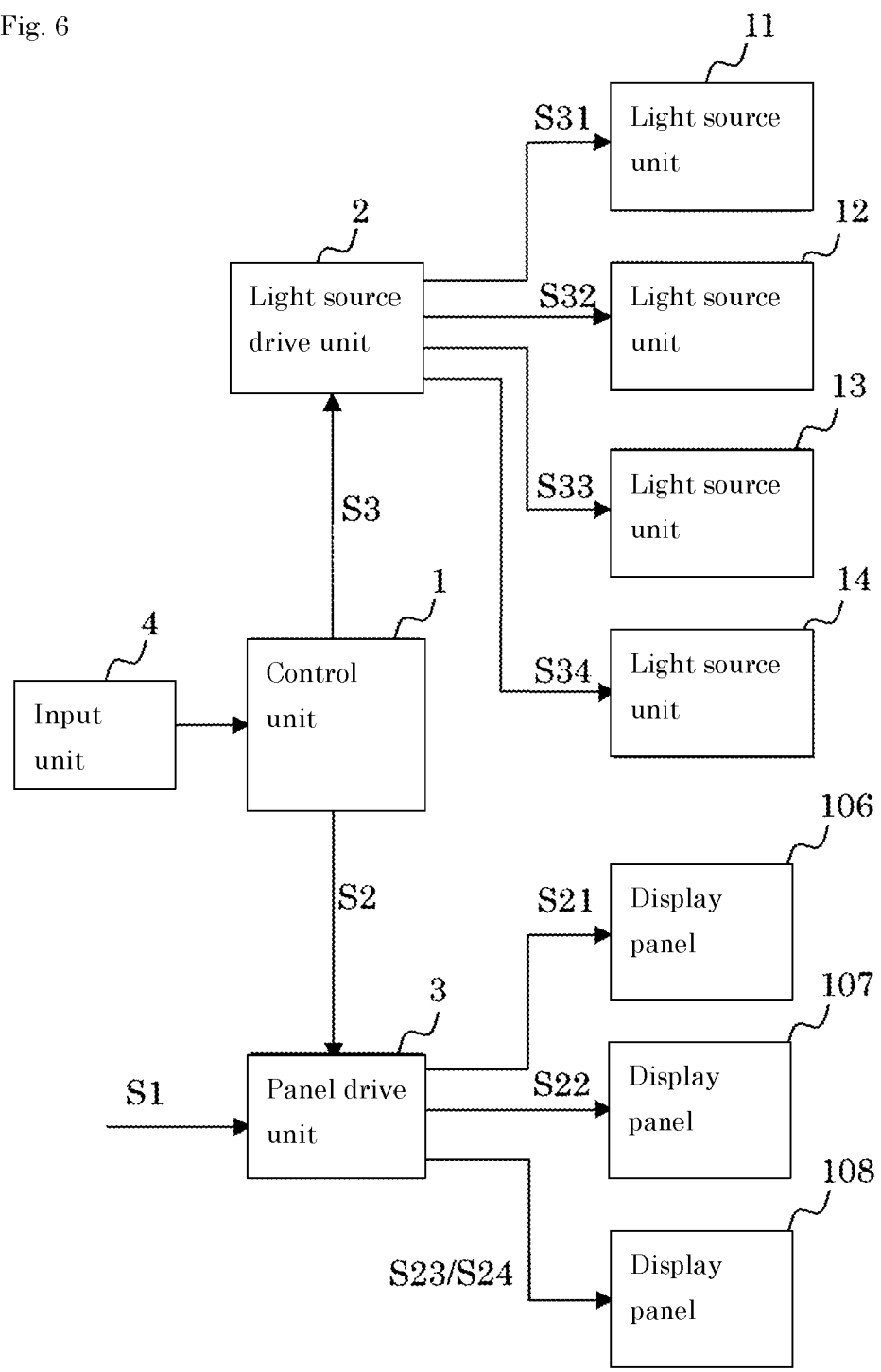
FIG. 6 is a block diagram showing the configuration of the control system of the projector shown in FIG. 1.

FIG. 6 shows an example of the control system of the projector. Referring to FIG. 6, the projector is equipped with light source drive unit 2 that drives light source units 11-14, panel drive unit 3 that drives display panels 106-108, input unit 4 that is provided with, for example, buttons or keys for operation that supply instruction signals according to the input operation of the user, and control unit 1 that receives the instruction signals from input unit 4 to control the operation of light source drive unit 2 and panel drive unit 3.

Control unit 1 both supplies drive timing signal S2 for driving each of display panels 106-108 to panel drive unit 3 and supplies lighting timing signal S3 for driving each of light source units 11-14 to light source drive unit 2.

Panel drive unit 3 individually drives display panels 106-108 based on video signal S1 applied as input from an outside device and drive timing signal S2 from control unit 1. In this case, the outside device is, for example, an information processing device such as a personal computer or an image apparatus such as a recorder.

More specifically, based on video signal S1 and drive timing signal S2, panel drive unit 3 generates image signal S21 that indicates a first green image, image signal S22 that indicates a red image, image signal S23 that indicates a blue image, and image signal S24 that indicates a second green image. The first green image that is based on image signal S21 is then formed on display panel 106, the red image that is based on image signal S22 is formed on display panel 107, and the blue image that is based on image signal S23 and the second green signal that is based on image signal S24 are formed in time divisions on display panel 106.

Light source drive unit 2 individually controls the lighted states of light source units 11-14 in accordance with lighting timing signal S3 from control unit 1.

More specifically, light source drive unit 2 generates lighting signal S31 that instructs lighting/extinguishing of light source unit 11, lighting signal S32 that instructs the lighting/extinguishing of light source unit 12, lighting signal S33 that indicates the lighting/extinguishing of light source unit 13, and lighting signal S34 that instructs the lighting/extinguishing of light source unit 14. The lighting operation of light source units 11-14 is controlled in accordance with these lighting signals S31-S34.

Figure 7:
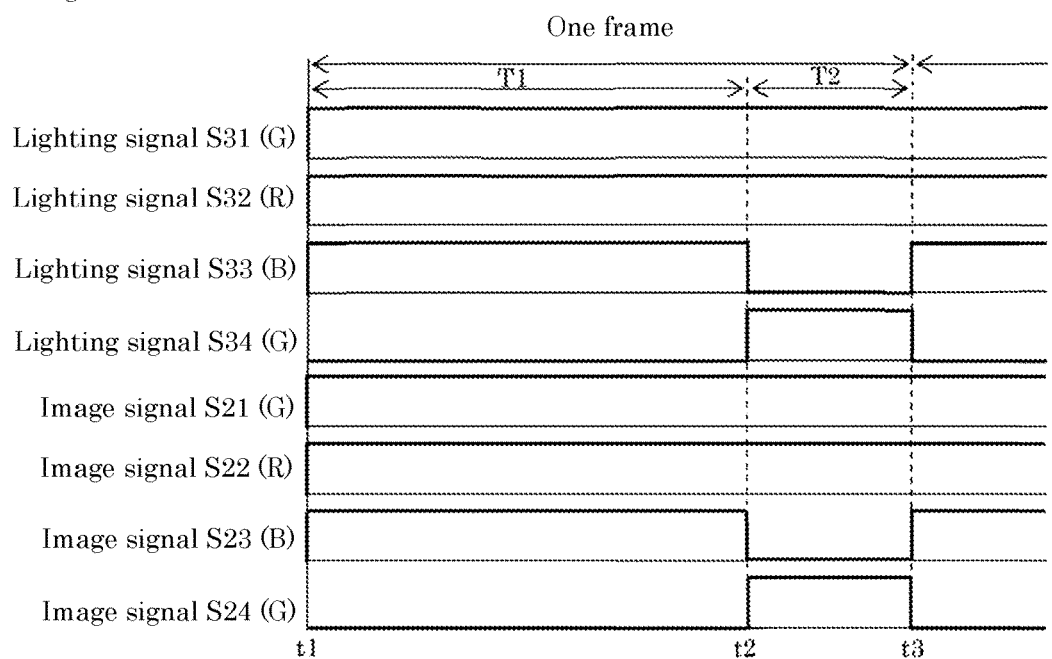
FIG. 7 is a timing chart showing an example of the image formation operation realized by a display panel of the projector shown in FIG. 1.

FIG. 7 is a timing chart showing an example of image signals S21-S24 and lighting signals S31-S34.

Referring to FIG. 7, of the interval of one frame, light source units 11, 12, and 14 are each assumed to be set to the ON state and light source unit 13 is assumed to be set to the OFF state in the interval T1 from time t1 (the starting point of the frame) until time t2. The first green image that is based on image signal S21 is then formed by display panel 106, the red image that is based on image signal S22 is formed by display panel 107, and the second green image that is based on image signal S24 is formed by display panel 108.

In interval T2 from time t2 until time t3 (the end time of the frame), light source units 11, 12, and 13 are each set to the ON state and light source unit 14 is set to the OFF state. The first green image that is based on image signal S21 is then formed by display panel 106, the red image that is based on image signal S22 is formed by display panel 107, and the blue image that is based on image signal S23 is formed by display panel 108.

According to the operation shown in FIG. 7, in interval T1, the first green image that is formed on display panel 106, the red image that is formed on display panel 107, and the second green image that is formed on display panel 108 are each projected by projection lens 110. In this case, a first superposed image in which the first green image, the red image, and the second green image are superposed is displayed on the projection surface.

In interval T2, the first green image that is formed on display panel 106, the red image that is formed on display panel 107, and the blue image that is formed on display panel 108 are each projected by projection lens 110. In this case, a second superposed image in which the first green image, the red image, and the blue image are superposed is displayed on the projection surface.

The user, due to the afterimage phenomenon, sees an image in which the first superposed image displayed in interval T1 and the second superposed image displayed in interval T2 are temporally blended. In this observed image, the second green image is shifted by 0.5 picture elements in the row direction and the column direction with respect to the first green image. As a result, the number of picture elements of the superposed image of the first and second green images is approximately four times the number of picture elements of each of display panels 106 and 108.

Due to the above-described characteristic of human visual perception, increasing the number of picture elements of the green image causes an apparent increase in the number of picture elements of the observed image. As a result, a higher resolution of the observed image can be achieved.

Figure 8:
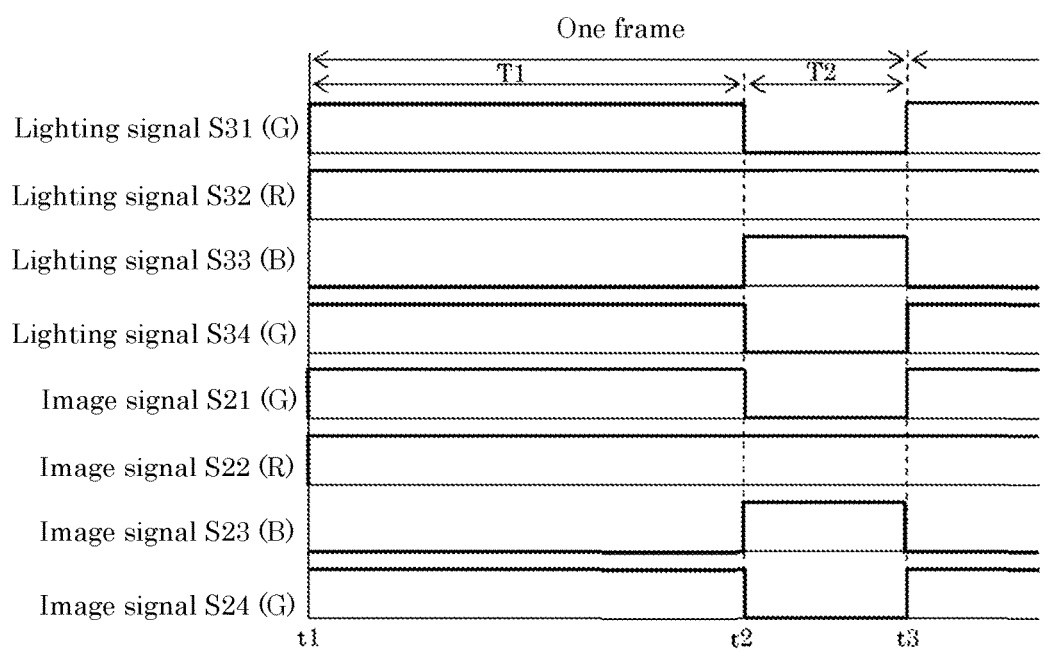
FIG. 8 is a timing chart showing another example of the image formation operation realized by a display panel of the projector shown in FIG. 1.

FIG. 8 is a timing chart that shows another example of image signals S21-S24 and lighting signals S31-S34.

Referring to FIG. 8, in interval T1, light source units 11, 12, and 14 are each set to the ON state and light source unit 13 is set to the OFF state. The first green image that is based on image signal S21 is then formed on display panel 106, the red image that is based on image signal S22 is formed on display panel 107, and the second green image that is based on image signal S24 is formed on display panel 108.

In interval T2, light source units 12 and 13 are each set to the ON state, and light source units 11 and 14 are each set to the OFF state. The red image that is based on image signal S22 is then formed on display panel 107, and the blue image that is based on image signal S23 is formed on display panel 108.

According to the operation shown in FIG. 8, in interval T1, the first green image that is formed on display panel 106, the red image that is formed on display panel 107, and the second green image that is formed on display panel 108 are each projected by projection lens 110. In this case, a first superposed image in which the first green image, the red image, and the second green image are superposed is displayed on the projection surface.

In interval T2, the red image that is formed on display panel 107 and the blue image that is formed on display panel 108 are each projected by projection lens 110. In this case, a second superposed image in which the red image and the blue image are superposed is displayed on the projection surface.

Due to the afterimage phenomenon, the user observes an image in which the first superposed image displayed in interval T1 and the second superposed image displayed in interval T2 are temporally blended. In this observed image, the second green image is shifted by 0.5 picture elements in the row direction and column direction with respect to the first green image. As a result, the number of picture elements of the superposed image of the first and second green images is approximately four times the number of picture elements of each of display panels 106 and 108.

Due to the above-described characteristic of human visual perception, the increase of the number of picture elements of the green image results in an increase of the apparent number of picture elements of the observed image itself, whereby higher resolution of the observed image can be achieved.

In the operations shown in FIGS. 7 and 8, intervals T1 and T2 can be set as appropriate taking into consideration the response characteristic of the display panels and the display period in which images can be blended based on the afterimage phenomenon of the human eye.

In addition, in order to reliably increase the number of picture elements of the observed image by the picture element shift, panel drive unit 3 may generate image signals S21 and S24 such that the content (for example, the luminance value) of the first green image and the second green image is different.

For example, in a case in which video signal S1 includes video signals R, G, and B that indicate images R, G, and B of resolution of 3840 (horizontal)×2160 (vertical), display panels 106-108 are each assumed to be panels having a resolution of 1920 (horizontal)×1080 (vertical). Panel drive unit 3 resolves image G of video signal G into a first image composed of odd-numbered lines and a second image composed of even-numbered lines. Panel drive unit 3 then generates image G1 in which picture elements are deleted in every other picture element in the horizontal direction for the first image and generates image signal S21 that indicates image G1. Panel drive unit 3 further generates image G2 in which picture elements are deleted in every other picture element in the horizontal direction for the second image and generates image signal S24 for the second image. Each of images G1 and G2 is an image having a resolution of 1920 (horizontal)×1080 (vertical).

No particular limitations are imposed on the above-described method of generating image signals S21 and 24. Image signals S21 and S24 may be generated by any method as long as the effect of increasing the number of picture elements by picture element shifting is obtained.

For video signals R and B, panel drive unit 3 implements a process of converting images R and B of a resolution of 3840 (horizontal)×2160 (vertical) to images R and B having a resolution of 1920 (horizontal)×1080 (vertical). A well-known resolution conversion method such as deleting picture elements can be applied as this process. Panel drive unit 3 then generates image signals S22 and S23 that indicate images R and B, respectively, and that have a resolution of 1920 (horizontal)×1080 (vertical).

The projector of the present exemplary embodiment described hereinabove exhibits the following action and effects.

In a known three-panel projector, display panel 108 displays only a blue image. In the present exemplary embodiment, display panel 108 is configured to display a blue image and a green image in time divisions, and further, this display panel 108 and display panel 106 that displays a green image are arranged with respect to projection lens 110 such that one projected image is shifted by a predetermined amount in the direction of alignment of picture elements with respect to the other projected image, whereby the number of picture elements of the green image is increased to thereby have the effect of increasing the number of picture elements of the observed image.

The two main points of alteration from a known three-panel projector are alteration of the arrangement of display panels and alteration of the image formation operation in the display panels, and provision of a new constituent element such as an optical path shifting means is therefore not necessary. As a result, increase in the size of the device, cost and power consumption can all be reduced.

Second Exemplary Embodiment

Figure 9:
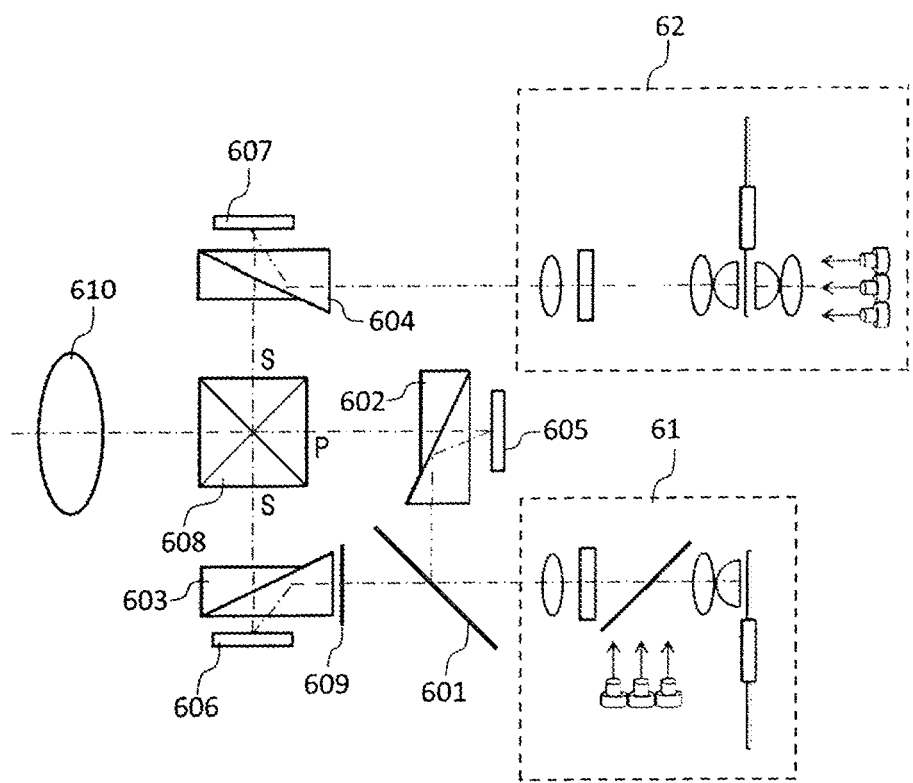
FIG. 9 is a schematic view showing the configuration of the projector according to the second exemplary embodiment of the present invention.

FIG. 9 is a schematic view showing the configuration of the projector according to the second exemplary embodiment of the present invention.

Referring to FIG. 9, the projector includes: light source units 61 and 62, dichroic mirror 601, TIR (Total Internal Reflection) prisms 602-604, digital micromirror devices (DMDs) 605-607, cross-dichroic prism 608, retardation plate 609, and projection lens 610.

Figure 10:
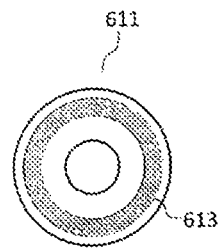
FIG. 10 is a schematic view showing the phosphor wheel of one light source unit of the projector shown in FIG. 9.

Light source unit 61 supplies yellow light (that includes a green component and a red component). Light source unit 61 is provided with, for example, phosphor wheel 611 as shown in FIG. 10. Region 613, in which a yellow phosphor is applied that emits yellow light in response to the irradiation of excitation light (laser light), is formed on phosphor wheel 611 along the circumferential direction.

Figure 11:
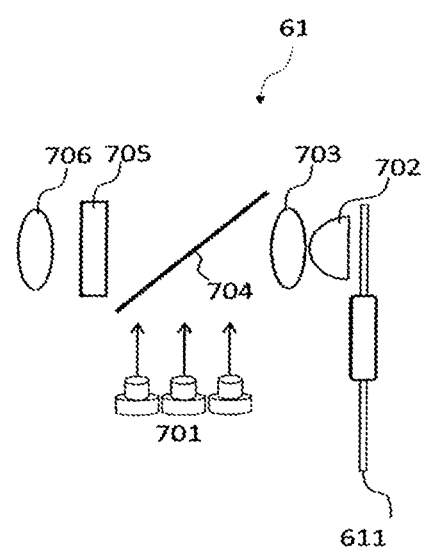
FIG. 11 is a schematic view showing the configuration of one light source unit of the projector shown in FIG. 9.

FIG. 11 shows an example of light source unit 61. Referring to FIG. 11, light source unit 61 includes laser 701 for excitation, condensing lenses 702 and 703, dichroic mirror 704, polarization conversion unit 705, and lens 706.

Laser 701 is a blue laser with an oscillation wavelength of, for example, 460 nm. The oscillation wavelength of laser 701 is not limited to 460 nm. Laser 701 may use a laser of any wavelength as long as the laser is capable of exciting the yellow phosphor.

The laser light that is emitted from laser 701 is irradiated into dichroic mirror 704. Dichroic mirror 704 has the property of reflecting light of 460 nm and transmitting light of the yellow wavelength band (including the green and red wavelength bands). Dichroic mirror 704 reflects the laser light from laser 701 toward phosphor wheel 611.

The laser light from dichroic mirror 704 passes by way of condensing lenses 702 and 703 and is irradiated upon region 613 of phosphor wheel 611 in which the yellow phosphor has been applied. In region 613, the yellow phosphor is excited by the laser light and yellow fluorescent light is emitted.

The yellow fluorescent light that is emitted from region 613 passes through condensing lenses 702 and 703 and dichroic mirror 704 and is irradiated into polarization conversion unit 705.

Polarization conversion unit 705 adjusts the incident light from dichroic mirror 704 to P-polarized light or S-polarized light. Polarization conversion unit 705 is similar to polarization conversion unit 204 shown in FIG. 2 and, for example, by the selection of a polarization beam splitter and retardation plate, is capable of adjusting to either polarization of P-polarization and S-polarization.

Lens 706 constitutes a portion of the optical system that irradiates the light from polarization conversion unit 705 to DMDs 605 and 606.

Light source unit 61 supplies blue light and green light in time divisions. The basic configuration of light source unit 61 is substantially the same as light source unit 62, but the configuration differs regarding, for example, the phosphor wheel or the laser light source.

Figure 12:
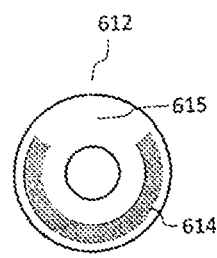
FIG. 12 is a schematic view showing the phosphor wheel of another light source unit of the projector shown in FIG. 9.

Light source unit 62 is provided with phosphor wheel 612 as shown in FIG. 12. In phosphor wheel 612, region 614 to which a green phosphor is applied that emits green fluorescent light in response to the irradiation of blue light (laser light) that is the excitation light and region 615 through which blue light (laser light) is transmitted are formed in the circumferential direction. Regions 614 and 615 are formed at a predetermined ratio in the circumferential direction. The number and ratio of regions 614 and 615 can be set as appropriate.

The unit configuration shown in FIG. 11 can be applied in light source unit 62. For example, in the unit shown in FIG. 11, dichroic mirror 704 is omitted and phosphor wheel 611 replaced by phosphor wheel 612. Still further, a set of condensing lenses 702 and 703 is further prepared and a laser having its peak wavelength in the blue wavelength band is used as laser 701. This set and laser 701 are arranged so as to face the surface of phosphor wheel 612 on the side opposite to the side on which lens 705 is arranged. Phosphor wheel 612 is rotated and the blue laser light from laser 701 is condensed on phosphor wheel 612 by condensing lenses 702 and 703.

In region 614 of phosphor wheel 612, green fluorescent light is emitted from the phosphor that is excited by blue laser light. The green fluorescent light (emitted luminous flux) that is radiated from the surface of region 614 on the side opposite to laser 701 is converted to parallel luminous flux by condensing lenses 702 and 703, and after having been adjusted to one polarization by polarization conversion unit 705, is emitted from lens 706.

In region 615 of phosphor wheel 612, the blue laser light is transmitted, whereby blue laser light (diffused light) is emitted from the surface of region 615 that is on the side opposite to laser 701. The blue laser light (diffused light) that is emitted from region 615 is converted to parallel luminous flux by condensing lenses 702 and 703, and after having been adjusted to one polarization by polarization conversion unit 705, is emitted from lens 706.

Lens 706 makes up a portion of the optical system that directs the light from polarization conversion unit 705 toward DMD 607.

By means of the above-described configuration, when phosphor wheel 612 is rotated at a predetermined speed, blue light and green light from light source unit 62 are alternately emitted.

In the present exemplary embodiment, yellow light (S-polarized light) is emitted from light source unit 61, and green light (P-polarized light) and blue light (P-polarized light) are alternately emitted from light source unit 62.

The yellow light (S-polarized light) that is emitted from light source unit 61 is irradiated into dichroic mirror 601. The yellow light contains a red component and a green component, and dichroic mirror 601 has the characteristic of transmitting light of the red component and reflecting light of the green component.

The red light that is transmitted through dichroic mirror 601 is irradiated into TIR prism 603 by way of retardation plate 609. Red light (P-polarized light) is irradiated into TIR prism 603 by way of retardation plate 609.

TIR prism 603 is a total reflection prism assembly that is composed of first and second right-angle prisms and in which a total reflection surface is provided. The first and second right-angle prisms each have first and second surfaces that make up the sides that form the right angle of a triangle and a third surface that forms the hypotenuse of the triangle and are arranged such that the third surfaces face each other.

The first surface of the first right-angle prism is the incident surface of TIR prism 603, and DMD 606 is arranged to face the second surface of the first right-angle prism. The second surface of the second right-angle prism is the emission surface of TIR prism 603.

The red light that is irradiated from retardation plate 609 to TIR prism 603 is totally reflected by the internal total reflection surfaces and is emitted from the second surface of the first right-angle prism. The light that is emitted from this second surface is irradiated into DMD 606.

DMD 606 is a display panel and includes a plurality of micromirrors. Each micromirror is configured to change its angle according to a drive voltage, the reflection angle differing for a case in which a drive voltage that indicates the ON state is supplied and a case in which a drive voltage that indicates the OFF state is supplied. Through the ON/OFF control of each micromirror according to an image signal, the incident luminous flux is spatially modulated to form an image.

A red image is formed by the reflected light (S-polarized light) from DMD 606. The red light (S-polarized light) from DMD 606 passes through TIR prism 603 and is irradiated into cross-dichroic prism 608.

The green light (S-polarized light) that is reflected by dichroic mirror 601 is irradiated into TIR prism 602. TIR prism 602 also has the same configuration as TIR prism 603.

The green light that is irradiated from dichroic mirror 601 into TIR prism 602 is totally reflected by the internal total reflection surfaces and is emitted from the second surface of the first right-angle prism. The light that is emitted from this second surface is irradiated into DMD 605.

DMD 605 also has the same configuration as DMD 606. A green image is formed by the reflected light (P-polarized light) from DMD 605. The green light (P-polarized light) from DMD 605 is transmitted through TIR prism 602 and is irradiated into cross-dichroic prism 608.

On the other hand, the blue light and green light (P-polarized light) that are emitted in time divisions from light source unit 62 are irradiated into TIR prism 604. TIR prism 604 also includes the same configuration as TIR prism 603.

The blue and green light (P-polarized light) that are irradiated from light source unit 62 into TIR prism 604 are totally reflected by the internal total reflection surfaces and are emitted from the second surface of the first right-angle prism. The light emitted from this second surface is irradiated into DMD 607.

DMD 607 also has the same configuration as DMD 606. A blue image or a green image is formed by the reflected light (S-polarized light) from DMD 607. The blue and green light (S-polarized light) from DMD 607 are transmitted through TIR prism 604 and irradiated into cross-dichroic prism 608.

Figure 13:
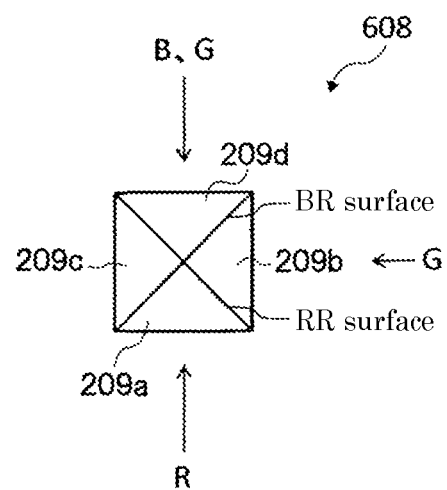
FIG. 13 is a schematic view showing an example of the cross-dichroic prism of the projector shown in FIG. 9.

As shown in FIG. 13, cross-dichroic prism 608 includes four right-angle prisms 209a-209d. Right-angle prisms 209a-209d are each similar to right-angle prisms 109a-109d, respectively, that are shown in FIG. 3, and are provided with an RR surface and BR surface.

The BR surface has the spectral transmission characteristics shown in FIGS. 4A and 4B, and the RR surface has the spectral transmission characteristics shown in FIGS. 4C and 4D.

In cross-dichroic prism 608 shown in FIG. 13, the third surfaces of each of right-angle prism 209a, 209b, and 209d are the first, second, and third incident surfaces, respectively, and the third surface of right-angle prism 209c is the emission surface.

The red light (S-polarized light) from DMD 606 is irradiated from the first incident surface, the green light (P-polarized light) from DMD 605 is irradiated from the second incident surface, and the blue light (S-polarized light) and green light (S-polarized light) from DMD 607 are irradiated from the third incident surface.

The red light (S-polarized light) that is irradiated from the first incident surface is reflected by the RR surface and then emitted from the emission surface. The green light (P-polarized light) that is irradiated from the second incident surface is transmitted through the BR surface and the RR surface and then emitted from the emission surface. The blue light (S-polarized light) and green light (S-polarized light) that are irradiated from the third incident surface are reflected by the BR surface and then emitted from the emission surface.

Projection lens 610 is arranged on the emission surface side of cross-dichroic prism 608. The center ray (optical axis) of each light beam from light source units 61 and 62 coincides with the optical axis of projection lens 610. Projection lens 610 enlarges and projects the images that are formed by DMDs 605-607 onto a projection screen.

Each of DMDs 605-607 is provided with an image formation region that forms an image that is composed of a plurality of picture elements. The numbers of picture elements and the sizes of the picture elements of DMDs 605-607 are identical. However, the relative positional relation of the image formation regions on the projection surface differs for DMD 607 and DMDs 605 and 606.

More specifically, on the projection surface, the image formation region of DMD 607 is projected on a position that is shifted by a predetermined amount in the horizontal direction (the direction of picture element rows), the vertical direction (the direction of picture element columns) or in both directions with respect to the projected position of the image formation region of DMD 605. For example, the positional relation of DMDs 605 and 607 is similar to the relative positional relation of the image formation regions of display panels 106 and 108 shown in FIG. 5. The projected position of image formation region of DMD 606 coincides with the projected position of the image formation region of DMD 607.

In the present exemplary embodiment as well, a panel arrangement is used in which the corresponding picture element of an image that is projected on the projection surface is shifted for DMD 607 and DMD 605 to increase the number of picture elements of the observed image when the projected image is viewed.

More specifically, a green image is formed in DMD 605, a red image is formed in DMD 606, and a blue image and green image are formed in time divisions in DMD 607. On the projection surface, the green image formed in DMD 607 is projected at a position that is shifted by 0.5 picture elements in each of the row direction and the column direction with respect to the projected position of the green image that is formed in DMD 605. Due to the afterimage phenomenon of the human eye, an image (superposed image) is observed in which these green images are spatially or temporally blended. The number of picture elements of this observed image is approximately four times the number of picture elements of each of DMDs 605 and 607.

The configuration and operation of the control system of the projector of the present exemplary embodiment are next described in detail.

Figure 14:
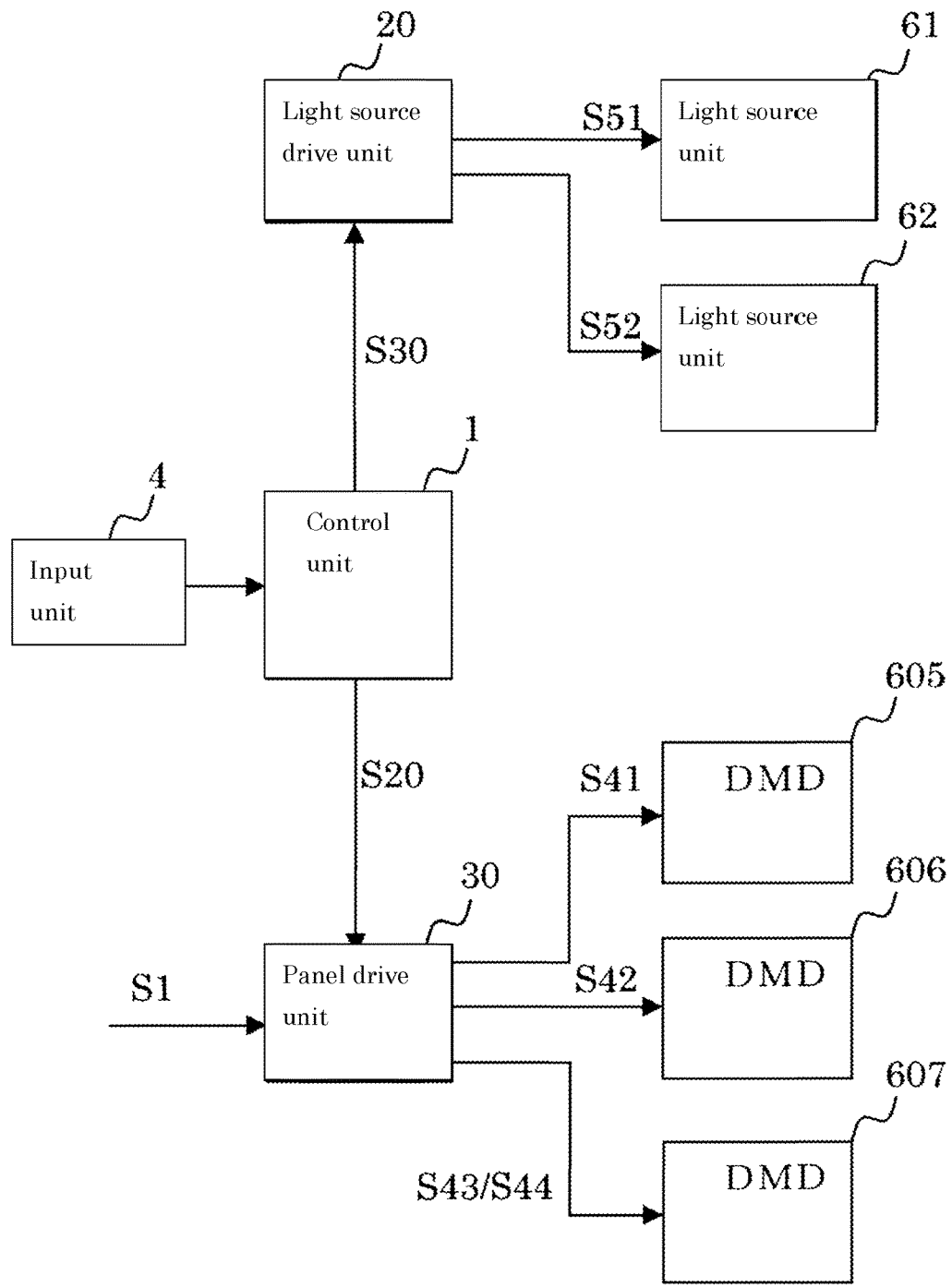
FIG. 14 is a block diagram showing the configuration of the control system of the projector shown in FIG. 9.

FIG. 14 shows an example of the control system of the projector of the present exemplary embodiment. Referring to FIG. 14, the projector includes: light source drive unit 20 that drives light source units 61 and 62, panel drive unit 30 that drives DMDs 605-607, input unit 4, and control unit 1 that receives instruction signals from input unit 4 to control the operation of light source drive unit 20 and panel drive unit 30. Input unit 4 is the same as the component shown in FIG. 6.

Control unit 1 both supplies drive timing signal S20 for driving each of DMDs 605-607 to panel drive unit 30 and supplies lighting timing signal S30 for driving each of light source units 61 and 62 to light source drive unit 20.

Panel drive unit 30 individually drives DMDs 605-607 based on video signal S1 that is received as input from an outside device and drive timing signal S20 from control unit 1. In this case, the outside device is an information processing device such as a personal computer or an image apparatus such as a recorder.

More specifically, based on video signal S1 and drive timing signal S20, panel drive unit 30 generates image signal S41 that indicates a first green image, image signal S42 that indicates a red image, image signal S43 that indicates a blue image, and image signal S44 that indicates a second green image. The first green image that is based on image signal S41 is formed in DMD 605, the red image that is based on image signal S42 is formed in DMD 606, and the blue image that is based on image signal S43 and the second green image that is based on image signal S44 are formed in time divisions in DMD 607.

Light source drive unit 20 individually controls the lighted states of light source units 61 and 62 in accordance with the lighting timing signal S3 from control unit 1. More specifically, light source drive unit 20 generates lighting signal S51 that instructs the lighting/extinguishing of light source unit 61 and lighting signal S52 that instructs the lighting/extinguishing of light source unit 62.

In light source unit 61, laser 701 lights up, and moreover, phosphor wheel 611 rotates in accordance with lighting signal S51, whereby light source unit 61 supplies yellow light.

In light source unit 62, laser 701 lights up, and moreover, phosphor wheel 612 rotates in accordance with lighting signal S52, whereby light source unit 62 supplies green light and blue light in time divisions.

In the present exemplary embodiment, image signals S41-S44 are the same as image signals S21-S24 shown in FIG. 7.

In interval T1, the first green image that is based on image signal S41 is formed by DMD 605, the red image that is based on image signal S42 is formed by DMD 606, and the second green image that is based on image signal S44 is formed by DMD 607.

In interval T2, the first green image that is based on image signal S41 is formed by DMD 605, the red image that is based on image signal S42 is formed by DMD 606, and the blue image that is based on image signal S43 is formed by DMD 607.

The operation of supplying green light and blue light in time divisions in light source unit 62 and the operation of forming the blue image and the second green image in time divisions in DMD 607 are synchronized.

In interval T1, the first green image that is formed in DMD 605, the red image that is formed in DMD 606, and the second green image that is formed in DMD 607 are each projected by projection lens 610. In this case, a first superposed image in which the first green image, the red image, and the second green image are superposed is displayed on the projection surface.

In interval T2, the first green image that is formed in DMD 605, the red image that is formed in DMD 606, and the blue image that is formed in DMD 607 are each projected by projection lens 610. In this case, a second superposed image in which the first green image, the red image, and the blue image are superposed is displayed on the projection surface.

Due to the afterimage phenomenon, the user observes an image in which the first superposed image that is displayed in interval T1 and the second superposed image that was displayed in interval T2 are temporally blended. In this observed image, the second green image is shifted by 0.5 picture elements in each of the row direction and the column direction with respect to the first green image. As a result, the number of picture elements of the superposed image of the first and second green images is approximately four times the number of picture elements of each of display panels 106 and 108.

Due to the above-described characteristics of human vision, the number of picture elements of the green image is increased, whereby the number of picture elements of the observed image itself appears to be increased. As a result, higher resolution of the observed image can be achieved.

The projector of the present exemplary embodiment also exhibits the same action and effects as the projector of the first exemplary embodiment.

Each of the projectors of the above-described exemplary embodiments are examples of the present invention, and the configuration and operation are open to appropriate modifications within a scope that does not depart from the basic idea of the invention.

For example, in the projector of the first exemplary embodiment, the relation of P-polarized light and S-polarized light may be reversed. In this case, the spectral transmission characteristics for each polarization direction are changed as appropriate for polarization beam splitters 103-105 and cross-dichroic prism 109.

In addition, although the projector of the first exemplary embodiment is configured such that a first green image is formed in display panel 106, a red image is formed in display panel 107, and a blue image and a second green image are formed in time divisions in display panel 108, the present invention is not limited to this form. The projector of the first exemplary embodiment may be configured such that a first green image is formed in display panel 106, a red image and second green image are formed in time divisions in display panel 107, and a blue image is formed in display panel 108.

In the cases described above, the projector is configured in FIG. 1 such that red light (P-polarized light) supplied from light source unit 12 and green light (P-polarized light) supplied from light source unit 14 are irradiated into display panel 107. The spectral transmission characteristics of the BR surface and RR surface of cross-dichroic prism 109 are then changed as follows. The characteristics of the BR surface are set to characteristics to reflect the blue light (S-polarized light) from display panel 108 and to transmit the green light (P-polarized light) from display panel 106 and the red light (S-polarized light) and the green light (S-polarized light) from display panel 107. On the other hand, the characteristics of the RR surface are set to characteristics to transmit the blue light (S-polarized light) from display panel 108 and the green light (P-polarized light) from display panel 106 and to reflect the red light (S-polarized light) and the green light (S-polarized light) from display panel 107. In this case, in FIG. 7 or FIG. 8, the ON/OFF relations between lighting signals S32 and S33 are mutually reversed and the ON/OFF relations between image signals S22 and S23 are mutually reversed.

Further, although the second green image is shifted by 0.5 picture elements in each of the row direction and column direction with respect to the first green image in the projector of the first and second exemplary embodiments, the picture element shift is not limited to this amount. The amount of picture element shifting should be set as appropriate within a range of from 0.4 to 0.6 times the picture element pitch or from 1.4 to 1.6 times the picture element pitch. However, the amount of picture element shift (the ideal value) for reliably obtaining the effect of increasing the number of picture elements is 0.5 picture elements.

Finally, although the present invention can assume forms such as shown in SUPPLEMENTARY NOTES 1-10 below, the present invention is not limited to these forms.

[Supplementary Note 1]

A projector comprising:

first and second display panels that are each equipped with a plurality of picture elements and that modulate incident light by means of the plurality of picture elements to form images; and projection means that superposes the images that are formed on the first and second display panels to project the superposed images on a projection surface;

wherein the first and second display panels are arranged such that the image of one of the display panels is projected on a position that is shifted by a predetermined distance with respect to the image of the other display panel.

[Supplementary Note 2]

In the projector described in SUPPLEMENTARY NOTE 1, the first display panel forms a first green image, and the second display panel alternately forms a second green image, in which at least the luminance differs from the first green image, and a blue or red image.

[Supplementary Note 3]

The projector described in SUPPLEMENTARY NOTE 2 further includes:

a third display panel that is equipped with a plurality of picture elements and that modulates incident light by means of the plurality of picture elements to form an image;

a first illumination unit that is equipped with a first green light source that supplies green light, the green light that is supplied from the first green light source irradiating the first display panel;

a second illumination unit that is equipped with a second green light source that supplies green light and a blue light source that supplies blue light, the green light that is supplied from the second green light source and the blue light that is supplied from the blue light source alternately irradiating the second display panel; and a third illumination unit that is equipped with a red light source that supplies red light, the red light that is supplied from the red light source irradiating the third display panel;

wherein the projection means has:

a color synthesizing unit that synthesizes the images that are formed in the first to third display panels; and a projection lens that projects the synthesized image that is synthesized in the color synthesizing unit; and wherein the perpendicular line that passes through the center of the image formation region of each of the first and third display panels and the perpendicular line that passes through the center of the image formation region of the second display panel are not in the same plane.

[Supplementary Note 4]

The projector as described in SUPPLEMENTARY NOTE 3 further includes:

control means that, based on an input video signal, controls the lighted states of the first and second green light sources, the red light source, and the blue light source and that causes the first to third display panels to display images;

wherein the control means:

in a first interval, causes lighting of the first green light source to cause the first display panel to form the first green image, causes lighting of the second green light source to cause the second display panel to form the second green image, and causes lighting of the red light source to cause the third display panel to form the red image; and in a second interval, causes lighting of the first green light source to cause the first display panel to form the first green image, causes lighting of the blue light source to cause the second display panel to form the blue image, and causes lighting of the red light source to cause the third display panel to form the red image.

[Supplementary Note 5]

The projector as described in SUPPLEMENTARY NOTE 3 further includes:

control means that, based on an input video signal, controls the lighted states of the first and second green light sources, the red light source, and the blue light source and that causes the first to third display panels to form images;

wherein the control means:

in a first interval, causes lighting of the first green light source to cause the first display panel to form the first green image, causes lighting of the second green light source to cause the second display panel to form the second green image, and causes lighting of the red light source to cause the third display panel to form the red image; and in a second interval, causes lighting of the blue light source to cause the second display panel to form the blue image and causes lighting of the red light source to cause the third display panel to form the red image.

[Supplementary Note 6]

The projector described in SUPPLEMENTARY NOTE 2 further includes:

a third display panel that forms an image composed of a plurality of picture elements;

a first illumination unit that supplies green light and red light, the green light irradiating the first display panel and the red light irradiating the third display panel; and a second illumination unit that alternately supplies blue light and green light, the blue and green light irradiating the second display panel;

wherein the projection means has:

a color synthesizing unit that synthesizes images that are formed by the first to third display panels and displayed; and a projection lens that projects the synthesized image that was synthesized in the color synthesizing unit;

wherein the perpendicular line that passes through the center of the image formation region of each of the first and third display panels and the perpendicular line that passes through the center of the image formation region of the second display panel are not in the same plane.

[Supplementary Note 7]

The projector described in SUPPLEMENTARY NOTE 6 further includes:

control means that, based on an input video signal, controls the lighted states of the first and second illumination units and causes the first to third display panels to form the images;

wherein the control means:

in a first interval, causes output of each of the green light and red light from the first illumination unit to both cause the first display panel to form the first green image and cause the third display panel to form the red image, and causes output of the green light from the second illumination unit to cause the second display panel to form the second green image;

in a second interval, causes output of each of the green light and red light from the first illumination unit to both cause the first display panel to form the first green image and cause the third display panel to form the red image, and causes output of the blue light from the second illumination unit to cause the second display panel to form the blue image.

[Supplementary Note 8]

In the projector as described in SUPPLEMENTARY NOTE 6 or 7, wherein the first illumination unit is provided with:

a first excitation light source that supplies excitation light;

a first phosphor wheel in which a yellow phosphor portion that is excited by the excitation light that is supplied from the first excitation light source and that emits fluorescent light having an emission peak wavelength in the yellow wavelength band is formed along the circumferential direction; and a dichroic mirror that separates the fluorescent light emitted from the yellow phosphor unit into red light and green light;

the first illumination unit being configured such that the first phosphor wheel is rotated, the excitation light supplied from the first excitation light source is irradiated upon the yellow phosphor portion, and the red light and green light that are separated by the dichroic mirror are each supplied; and the second illumination unit is provided with:

a second excitation light source that supplies blue light; and a second phosphor wheel, in which a green phosphor portion that is excited by the blue light that is supplied from the second excitation light source to emit green fluorescent light, and a transmission portion through which the blue excitation light is transmitted are formed in predetermined proportions along the circumferential direction;

the second illumination unit being configured such that the second phosphor wheel is rotated, the blue light that is supplied from the second excitation light source irradiates the green phosphor portion and the transmission portion, and the green fluorescent light that is emitted from the green phosphor portion and the blue light from the second excitation light source that is transmitted through the transmission portion are alternately supplied.

[Supplementary Note 9]

In the projector as described in any one of SUPPLEMENTARY NOTES 1 to 8, the direction of shifting of the image of one display panel with respect to the image of the other display panel is at least one of the row direction and the column direction of the array of the picture elements.

[Supplementary Note 10]

An image display method is carried out in a projector that is provided with first and second display panels that are each equipped with a plurality of picture elements and that modulate incident light by means of the plurality of picture elements to form images and that superposes the images formed by the first and second display panels to project the superposed images on a projection surface, the method including:

arranging the first and second display panels such that the image of one display panel is projected on a position that is shifted by a predetermined distance with respect to the image of the other display panel; and forming a first green image on the first display panel, and alternately forming a second green image, in which at least the luminance differs from that of the first green image, and a blue image or red image on the second display panel.

In the projectors described in SUPPLEMENTARY NOTES 1 and 2, the first and second display panels correspond to display panels 106 and 108 of the projector of the first exemplary embodiment (or to DMDs 605 and 607 of the projector of the second exemplary embodiment). The projection means corresponds to projection lens 110 and dichroic prism 109 (or projection lens 610 and dichroic prism 608 of the projector of the second exemplary embodiment).

The projector of the above-described SUPPLEMENTARY NOTES 3-5 corresponds to the projector of the first exemplary embodiment. The third display panel corresponds to display panel 107. The first illumination unit corresponds to, for example, light source unit 11 and polarization beam splitter 103. The second illumination unit corresponds to, for example, light source units 13 and 14, dichroic mirror 102, and polarization beam splitter 105. The third illumination unit corresponds to, for example, light source unit 12 and polarization beam splitter 104. The control means is realized as a portion of the functions of parts composed of control unit 1, light source drive unit 2, and panel drive unit 3.

The projector described in SUPPLEMENTARY NOTES 6-8 above corresponds to the projector of the second exemplary embodiment. The third display panel corresponds to DMD 606. The first illumination unit corresponds to, for example, light source unit 61, dichroic mirror 601, retardation plate 609, and TIR prisms 602 and 603. The second illumination unit corresponds to, for example, light source unit 62 and TIR prism 604. The control means is realized as a portion of the functions of parts that are composed of control unit 1, light source drive unit 20, and panel drive unit 30.

The invention claimed is:

1. A projector comprising:
   first and second display panels that are each equipped with a plurality of picture elements and that modulate incident light by means of said plurality of picture elements to form images;
   a projection unit that superposes said images that are formed on said first and second display panels to project the superposed images on a projection surface;

wherein said first and second display panels are arranged such that the image of one of the display panels is projected on a position that is shifted by a predetermined distance with respect to the image of the other display panel, wherein said first display panel forms a first green image, and said second display panel alternately forms a second green image, in which at least the luminance differs from said first green image, and a blue or red image;

a third display panel that is equipped with a plurality of picture elements and that modulates incident light by said plurality of picture elements to form an image;

a first illumination unit that supplies green light and red light, the green light irradiating said first display panel and the red light irradiating said third display panel; and a second illumination unit that alternately supplies blue light and green light, the blue and green light irradiating said second display panel;

wherein said projection unit comprises:
  a color synthesizing unit that synthesizes images that are formed by said first to third display panels; and
  a projection lens that projects the synchronized image that was synthesized in said color synthesizing unit and wherein a perpendicular line that passes through the center of the image formation region of each of said first and third display panels and a perpendicular line that passes through the center of the image formation region of said second display panel are not in the same plane, wherein:
said first illumination unit is equipped with:
  a first excitation light source that supplies excitation light
  a first phosphor wheel in which a yellow phosphor portion that is excited by said excitation light that is supplied from said first excitation light source and emits fluorescent light having an emission peak wavelength in the yellow wavelength band is formed along the circumferential direction; and
  a dichroic mirror that separates said fluorescent light emitted from said yellow phosphor unit into red light and green light;
said first illumination unit being configured such that said first phosphor wheel is rotated, said excitation light supplied from said first excitation light source is irradiated upon said yellow phosphor portion, and said red light and green light that are separated by said dichroic mirror are each supplied; and
said second illumination unit is provided with:
  a second excitation light source that supplies blue light and
  a second phosphor wheel, in which a green phosphor portion that is excited by said blue light that is supplied from said second excitation light source to emit green fluorescent light, and a transmission portion through which said blue excitation light is transmitted are formed in a predetermined ratio along the circumferential direction;
said second illumination unit being configured such that said second phosphor wheel is rotated, said blue light that is supplied from said second excitation light source irradiates said green phosphor portion and said transmission portion, and said green fluorescent light that is emitted from said green phosphor portion and said blue light from said second excitation light source that is transmitted through said transmission portion are alternately supplied.

2. The projector as set forth in claim 1, further comprising:
  the first illumination unit that is equipped with a first green light source that supplies green light;
  the second illumination unit that is equipped with a second green light source that supplies green light and a blue light source that supplies blue light; and
  a third illumination unit that is equipped with a red light source that supplies red light, said red light that is supplied from said red light source irradiating said third display panel.

3. The projector as set forth in claim 2, further comprising:
  a control unit that, based on an input video signal, controls the lighted states of said first and second green light sources, red light source, and blue light source and that causes said first to third display panels to display images;
  wherein said control unit:
    in a first interval, causes lighting of said first green light source to cause said first display panel to form said first green image, causes lighting of said second green light source to cause said second display panel to form said second green image, and causes lighting of said red light source to cause said third display panel to form said red image; and
    in a second interval, causes lighting of said first green light source to cause said first display panel to form said first green image, causes lighting of said blue light source to cause said second display panel to form said blue image, and causes lighting of said red light source to cause said third display panel to form said red image.

4. The projector as set forth in claim 2, further comprising:
  a control unit that, based on an input video signal, controls the lighted states of said first and second green light sources, red light source, and blue light source and that causes said first to third display panels to form images;
  wherein said control unit:
    in a first interval, causes lighting of said first green light source to cause said first display panel to form said first green image, causes lighting of said second green light source to cause said second display panel to form said second green image, and causes lighting of said red light source to cause said third display panel to form said red image; and
    in a second interval, causes lighting of said blue light source to cause said second display panel to form said blue image and causes lighting of said red light source to cause said third display panel to form said red image.

5. The projector as set forth in claim 1, further comprising:
  a control unit that, based on an input video signal, controls the lighted states of said first and second illumination units and that causes said first to third display panels to form said images;
  wherein said control unit:
    in a first interval, causes output of each of said green light and red light from said first illumination unit to both cause said first display panel to form said first green image and cause said third display panel to form said red image, and causes output of said green light from said second illumination unit to cause said second display panel to form said second green image;

in a second interval, causes output of each of said green light and red light from said first illumination unit to both cause said first display panel to form said first green image and cause said third display panel to form said red image, and causes output of said blue light from said second illumination unit to cause said second display panel to form said blue image.

6. The projector as set forth in claim 1, wherein the direction of shifting of the image of said one display panel with respect to the image of said other display panel is at least one of the row direction and the column direction of the array of said picture elements.

7. An image display method that is carried out in a projector that is equipped with first and second display panels that are each equipped with a plurality of picture elements and that modulate incident light by said plurality of picture elements to form images and that superposes said images formed by said first and second display panels to project the superposed images on a projection surface, said method comprising:

arranging said first and second display panels such that the image of one display panel is projected on a position that is shifted by a predetermined distance with respect to the image of the other display panel;

forming a first green image on said first display panel, and alternately forming on said second display panel a second green image, in which at least the luminance differs from that of said first green image, and a blue image or a red image, wherein said first display panel forms a first green image, and said second display panel alternately forms a second green image, in which at least the luminance differs from said first green image, and a blue or red image, modulating, by a third display panel that is equipped with a plurality of picture elements, incident light by said plurality of picture elements to form an image;

supplying, by a first illumination unit, green light and red light, the green light irradiating said first display panel and the red light irradiating said third display panel; and alternately supplying, by a second illumination unit, blue light and green light, the blue and green light irradiating said second display panel;

synthesizing, by a color synthesizing unit, images that are formed by said first to third display panels; and projecting, by a projection lens, the synchronized image that was synthesized in said color synthesizing unit and wherein a perpendicular line that passes through the center of the image formation region of each of said first and third display panels and a perpendicular line that passes through the center of the image formation region of said second display panel are not in the same plane, wherein:

said first illumination unit is equipped with:

a first excitation light source that supplies excitation light a first phosphor wheel in which a yellow phosphor portion that is excited by said excitation light that is supplied from said first excitation light source and emits fluorescent light having an emission peak wavelength in the yellow wavelength band is formed along the circumferential direction; and a dichroic mirror that separates said fluorescent light emitted from said yellow phosphor unit into red light and green light;

said first illumination unit being configured such that said first phosphor wheel is rotated, said excitation light supplied from said first excitation light source is irradiated upon said yellow phosphor portion, and said red light and green light that are separated by said dichroic mirror are each supplied; and said second illumination unit is provided with:

a second excitation light source that supplies blue light and a second phosphor wheel, in which a green phosphor portion that is excited by said blue light that is supplied from said second excitation light source to emit green fluorescent light, and a transmission portion through which said blue excitation light is transmitted are formed in a predetermined ratio along the circumferential direction;

said second illumination unit being configured such that said second phosphor wheel is rotated, said blue light that is supplied from said second excitation light source irradiates said green phosphor portion and said transmission portion, and said green fluorescent light that is emitted from said green phosphor portion and said blue light from said second excitation light source that is transmitted through said transmission portion are alternately supplied.

* * * * *